United States Patent
Agarwal et al.

(10) Patent No.: US 11,308,431 B2
(45) Date of Patent: Apr. 19, 2022

(54) HIERARCHICAL OPTIMIZATION FOR PROCESSING OBJECTIVES SEQUENTIALLY AND/OR ITERATIVELY

(71) Applicant: INTUIT INC., Mountain View, CA (US)

(72) Inventors: Sudhir Agarwal, Palo Alto, CA (US); Roland Allen Sanford, II, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/922,187

(22) Filed: Jul. 7, 2020

(65) Prior Publication Data

US 2022/0012663 A1 Jan. 13, 2022

(51) Int. Cl.

| | |
|---|---|
| *G06Q 10/00* | (2012.01) |
| *G06Q 10/06* | (2012.01) |
| *G06Q 30/00* | (2012.01) |
| *G06Q 10/04* | (2012.01) |
| *G06N 5/04* | (2006.01) |
| *G06Q 40/06* | (2012.01) |

(Continued)

(52) U.S. Cl.
CPC ......... *G06Q 10/06316* (2013.01); *G06N 5/04* (2013.01); *G06Q 10/04* (2013.01); *G06Q 30/016* (2013.01); *G06Q 40/02* (2013.01); *G06Q 40/06* (2013.01); *G06Q 40/10* (2013.01)

(58) Field of Classification Search
None
See application file for complete search history.

(56) References Cited

U.S. PATENT DOCUMENTS

| | | | |
|---|---|---|---|
| 2010/0169126 A1* | 7/2010 | Chatter | G06Q 40/06 705/4 |
| 2011/0184884 A1* | 7/2011 | Lyons | G06Q 40/06 705/36 R |

(Continued)

OTHER PUBLICATIONS

Jarosz, Piotr, A Methodology for Optimization in Multistage Industrial Processes: a Pilot Study, Apr. 2015, Hindawi Publishing Corporation, https://downloads.hindawi.com/journals/mpe/2015/182679.pdf, p. 1.-11. (Year: 2015).*

*Primary Examiner* — Joseph M Waesco
(74) *Attorney, Agent, or Firm* — Patterson & Sheridan, LLP

(57) ABSTRACT

Certain aspects of the present disclosure provide techniques for hierarchical optimization including: receiving a request to optimize a primary objective; determining a set of stages to optimize the primary objective; for each respective stage of the set of stages: determining an objective function; when the respective stage is the first stage to be processed: determining values of a set of variable inputs to the respective stage and an output of the objective function; when the respective stage is not the first stage: updating a set of fixed inputs to the respective stage by including the variable inputs to one or more previously processed stages and their corresponding values to the set of fixed inputs to the respective stage; determining values of the set of variable inputs to the respective stage and output of the objective function for the respective stage; providing a final output for display on a display device.

20 Claims, 5 Drawing Sheets

(51) Int. Cl.
 *G06Q 40/00* (2012.01)
 *G06Q 40/02* (2012.01)

(56) References Cited

U.S. PATENT DOCUMENTS

| | | | |
|---|---|---|---|
| 2012/0035984 A1* | 2/2012 | Gorur Narayana Srinivasa | G06Q 30/0206 705/7.35 |
| 2013/0311351 A1* | 11/2013 | Chatter | G06Q 40/08 705/37 |
| 2017/0220928 A1* | 8/2017 | Hajizadeh | G06N 7/005 |
| 2017/0323239 A1* | 11/2017 | Johnson | G06Q 10/0635 |
| 2018/0018567 A1* | 1/2018 | Yoshizumi | G06F 17/11 |
| 2020/0027012 A1* | 1/2020 | Adams | G06N 20/10 |
| 2020/0051550 A1* | 2/2020 | Baker | G06N 20/20 |
| 2020/0096994 A1* | 3/2020 | Cella | G05B 23/024 |
| 2020/0143291 A1* | 5/2020 | Besanson Tuma | G06N 20/00 |
| 2020/0257984 A1* | 8/2020 | Vahdat | G06N 3/08 |

\* cited by examiner

HIERARCHICAL OPTIMIZATION FOR PROCESSING OBJECTIVES SEQUENTIALLY AND/OR ITERATIVELY

INTRODUCTION

Aspects of the present disclosure relate to computationally efficient systems and methods for hierarchical optimization for processing objectives sequentially and/or iteratively.

Generally, problems or objectives that financial institutions (e.g., tax agencies, financial planning agencies, and the like) are asked to resolve by their customers vary from one customer to another customer due to the different circumstances of the customers. Further, such objectives may be complex and regulated by multiple regulations. An example of such an objective is to minimize tax liability. Resolving such objectives may require calculating values of a large number of variables. Additionally, the regulations may cause such objectives to be expressed in non-linear mathematical expressions and may constrain the values of the variables and/or the results of the objectives by non-linear constraints.

Therefore, solving such objectives may require non-linear computations. However, non-linear computations of such objectives using existing systems and techniques may consume a significant amount of computing resources (e.g., processor cycles), and may require time such that it would not be feasible in multiple practical scenarios. Furthermore, providing a desired result of the customers' objectives may require optimizing an initial result when solving the objective. However, existing optimizers may not be capable to accurately optimize non-linear mathematical expressions within a feasible amount of time. Therefore, existing optimizers may fail to provide results that the customers are seeking.

Additionally, the different circumstances of the customers may lead to different combinations of the objectives. For example, a combination of objectives may be to minimize tax liability and maximize retirement contributions. However, existing systems may be hard-coded for specific objectives and/or solutions. Therefore, such rigidity of existing systems may not allow the various combinations of different objectives for the different customers or it may be highly inefficient to use the existing systems and techniques to combine the different objectives of the customers.

Accordingly, what is needed are improved systems and techniques that efficiently combine and optimize different customer objectives.

BRIEF SUMMARY

Certain embodiments provide a method for hierarchical optimization. The method generally includes receiving a request to optimize a primary objective from a requestor. The method further includes determining, based on the request, an ordered set of stages to optimize the primary objective. The method also includes, for each respective stage of the set of stages: determining, based on the objective, an objective function for the respective stage; determining whether the respective stage is a first stage of the set of stages to be processed; in response to determining that the respective stage is the first stage of the set of stages to be processed: determining, based at least in part on the objective function of the stage, values of a set of variable inputs to the respective stage and an output of the objective function for the respective stage; and in response to determining that the stage is not the first stage of the set of stages to be processed: updating a set of fixed inputs to the respective stage by including the variable inputs to one or more previously processed stages of the set of stages and their corresponding values to a set of fixed inputs to the respective stage; and determining values of the set of variable inputs to the respective stage and an output of the objective function for the respective stage based at least in part on: the objective function for the respective stage, the updated set of fixed inputs to the respective stage, and the output of an objective function for the previously processed stages. The method further includes providing, based on outputs of the set of stages, a final output to the requestor for display on a display device.

Certain embodiments provide a processing system, comprising: a memory comprising computer-executable instructions; a processor configured to execute the computer-executable instructions and cause the processing system to: receive a request to optimize a primary objective from a requestor; determine, based on the request, an ordered set of stages to optimize the primary objective; for each respective stage of the set of stages: determine, based on the objective, an objective function for the respective stage; determine whether the respective stage is a first stage of the set of stages to be processed; when the respective stage is the first stage of the set of stages to be processed: determine, based at least in part on the objective function of the stage, values of a set of variable inputs to the respective stage and an output of the objective function for the respective stage; and when the stage is not the first stage of the set of stages to be processed: update a set of fixed inputs to the respective stage by including the variable inputs to one or more previously processed stages of the set of stages and their corresponding values to a set of fixed inputs to the respective stage; and determine values of the set of variable inputs to the respective stage and an output of the objective function for the respective stage based at least in part on: the objective function for the respective stage, the updated set of fixed inputs to the respective stage, and the output of an objective function for the previously processed stages; and provide, based on outputs of the set of stages, a final output to the requestor for display on a display device Certain embodiments provide a non-transitory computer-readable medium comprising computer-executable instructions, which, when executed by a processing system, cause the processing system to perform a method for receiving a request to optimize a primary objective from a requestor; determining, based on the request, an ordered set of stages to optimize the primary objective; for each respective stage of the set of stages: determining, based on the objective, an objective function for the respective stage; determining whether the respective stage is a first stage of the set of stages to be processed; in response to determining that the respective stage is the first stage of the set of stages to be processed: determining, based at least in part on the objective function of the stage, values of a set of variable inputs to the respective stage and an output of the objective function for the respective stage; and in response to determining that the stage is not the first stage of the set of stages to be processed: updating a set of fixed inputs to the respective stage by including the variable inputs to one or more previously processed stages of the set of stages and their corresponding values to a set of fixed inputs to the respective stage; and determining values of the set of variable inputs to the respective stage and an output of the objective function for the respective stage based at least in part on: the objective function for the respective stage, the updated set of fixed inputs to the respective stage, and the output of an objective function for the previously processed stages; providing, based on outputs of the set of stages, a final output to the requestor for display on a display device.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
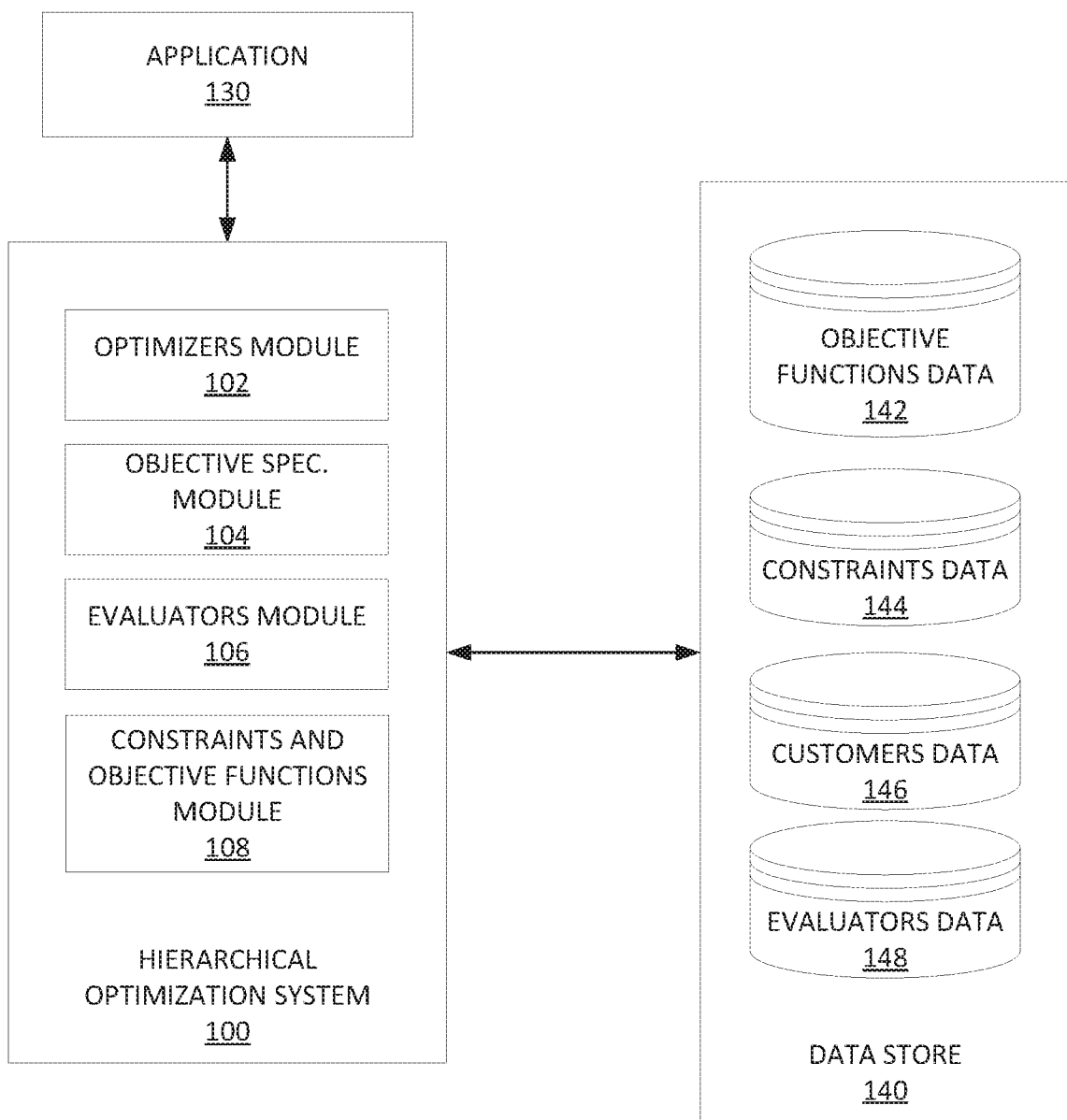
FIG. 1 depicts an example system of hierarchical optimization for processing objectives sequentially and/or time steps iteratively, in accordance with certain embodiments of the present disclosure.

Aspects of the present disclosure provide apparatuses, methods, processing systems, and computer readable mediums for hierarchical optimization for processing objectives sequentially and/or iteratively.

Objectives

An objective, as described herein, may refer to an objective of a customer. Examples of objectives may include, but are not limited to, minimizing tax liability, maximizing tax refunds, paying off debt, reducing debt payments, maximizing retirement contributions, and the like. An objective may be defined and/or configured by users of systems described herein, such as a domain expert. Examples of domain experts include, but are not limited to, an accountant, a tax analyst, a financial advisor, and the like. An objective may satisfy various regulations and/or business logic, which may constrain the values of the variable inputs and results calculated by an objective function associated with the objective.

Objective Functions

An objective function, as described herein, is a set of stored machine-readable instructions and/or circuitry that codify the business logic, and/or regulations and their constraints related to and/or affecting an objective associated with the objective function. For example, an objective function associated with calculating tax liability of a customer may be a set of stored machine-readable instructions configured to calculate tax liability of a taxable person based on the various regulations, constraints, and/or business logic related to and/or affecting tax liability calculations.

An objective function may be configured to receive a set of fixed and variable inputs. The objective function may be configured to calculate values of variable inputs based on the constraints indicated and/or specified by the various regulations and/or business logic affecting and/or related to the objective associated with the objective function. The objective function may be configured to calculate an output based on the values of the fixed inputs and the calculated values of the variable inputs. The value of the output of the objective function may be constrained by the constraints specified and/or indicated by the various regulations and/or business logic affecting and/or related to the objective associated with the objective function.

Primary Objectives

A primary objective, as described herein, may refer to an overall objective of a customer. A primary objective may include one or more objectives. For the purpose of illustrating a clear hierarchy between an objective and a primary objective that includes one or more objectives, the objectives, when included in a primary objective, are referred to herein as sub-objectives of the primary objective. For example, a primary objective may be to minimize tax liability and maximize retirement contributions, where this primary objective has two sub-objectives of (1) minimize tax liability objective and (2) maximize retirement contributions objective. The primary objectives may be defined by a user, such as a domain expert.

A primary objective that includes multiple sub-objectives may be associated with multiple objective functions, where each objective function is associated with a corresponding objective of the primary objective. For example, a primary objective of minimizing tax liability and maximizing retirement contributions may be associated with an objective function that calculates tax liability and an objective function that calculates retirement contributions. An objective may be associated with an objective function by a user, such as a domain expert.

Hierarchical Optimization

Solving an objective may include optimizing a large number of variables (e.g., thousands of variables) to accurately generate the result of the objective. However, conventional optimizer systems and techniques may fail to sufficiently optimize a large number of variables within a sufficient amount of time to be successfully used in real world applications. For example, conventional optimizer systems and techniques may require several hours and/or days to accurately optimize the results of an objective with a large number of variables (e.g., 1000 variables). However, consuming such a significant amount of time to deliver a result is impractical and not feasible to be applied in a real world application because a user (e.g., a domain expert) of the application may need to provide immediate advice to a customer.

Furthermore, conventional optimizer systems and techniques may not be configured to optimize multiple sub-objectives or a sub-objective over multiple time steps.

Additionally, to find the most optimized and/or accurate solution for a sub-objective, the optimizer systems and techniques may have to be configured to compute local and global optimized values. However, conventional optimizer systems and techniques may be configured to be only local optimizers or only global optimizers, not both, and thus may fail to provide the most optimized result for the sub-objective.

Accordingly, the hierarchical optimization systems and techniques described herein may be configured to optimize a large number of variables of a sub-objective in a sufficient amount of time to be successfully used in a real-world application by iteratively optimizing subsets of the total number of variables of the sub-objective. By iteratively optimizing the subsets of the total number of variables, the hierarchical optimization systems and techniques described herein may optimize locally and globally to generate an optimal solution for the sub-objective.

Furthermore, the hierarchical optimization systems and techniques described herein may be configured to process a primary objective comprising multiple sub-objectives in multiple stages such that each stage is associated with a sub-objective of the primary objective. For example, if a primary objective is to minimize the tax liability and maximize retirement contributions, then the hierarchical optimization systems and techniques described herein may process the primary objective in two stages, where the first stage is associated with the sub-objective of minimizing the tax liability and the second stage is associated with the sub-objective of maximizing the retirement contributions.

The hierarchical optimization systems and techniques described herein may be configured to generate an optimal solution for the primary objective within a sufficient amount of time to be used in a real-world application by reducing the search space for the optimizers. The hierarchical optimization systems and techniques described herein may reduce the search space for the optimizers by processing the multiple stages of the primary objective sequentially and by providing the calculated values of the variable inputs of one stage as fixed inputs into the next stage. The reduced search space reduces the amount of computing resources allocated and/or utilized for optimizing the variables of an objective, and reduces the time to optimize the variables of the objective and generate the result of the objective.

Figure 2:
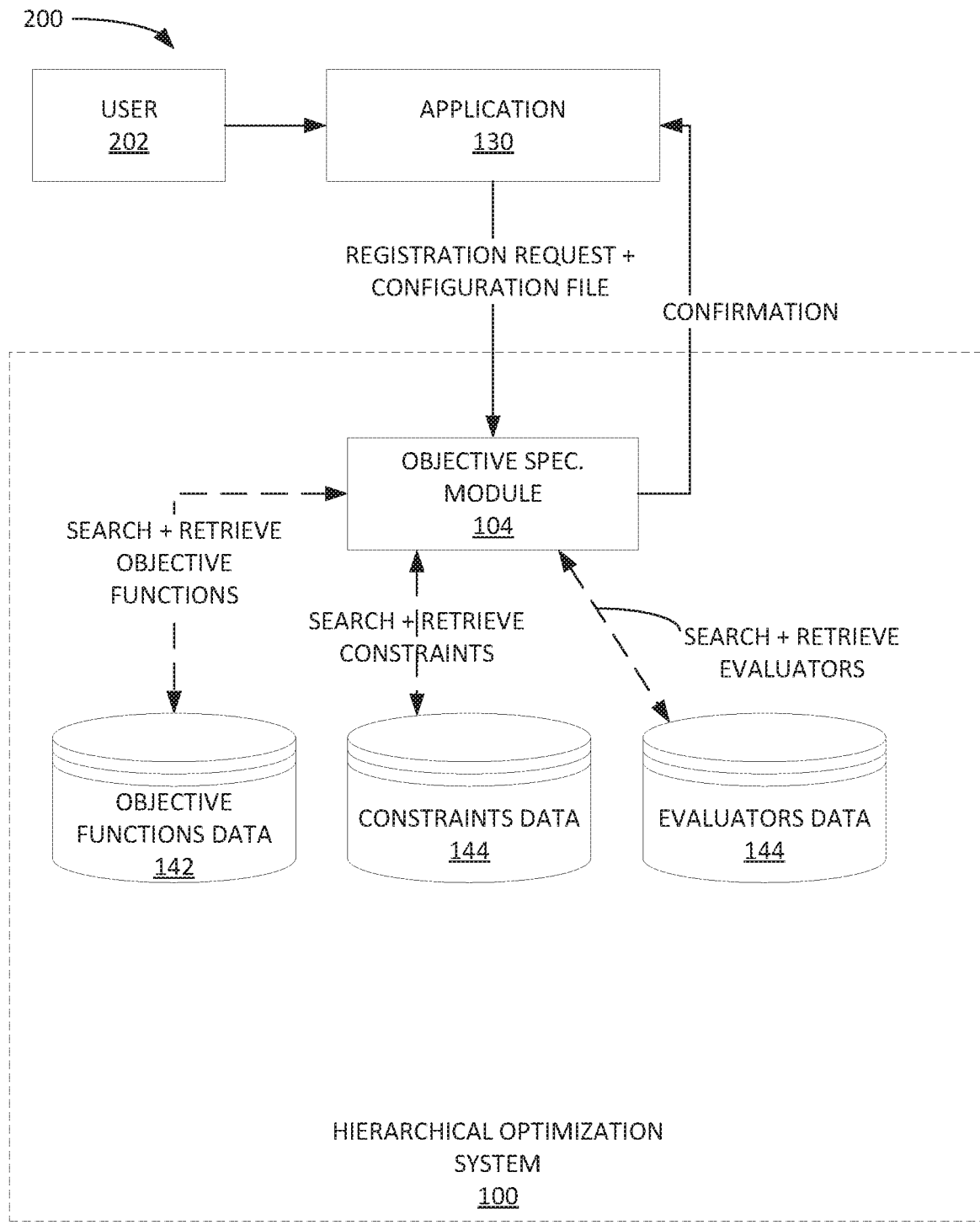
FIG. 2 depicts an example process flow for registering a new primary objective, in accordance with certain embodiments of the present disclosure.
Figure 3:
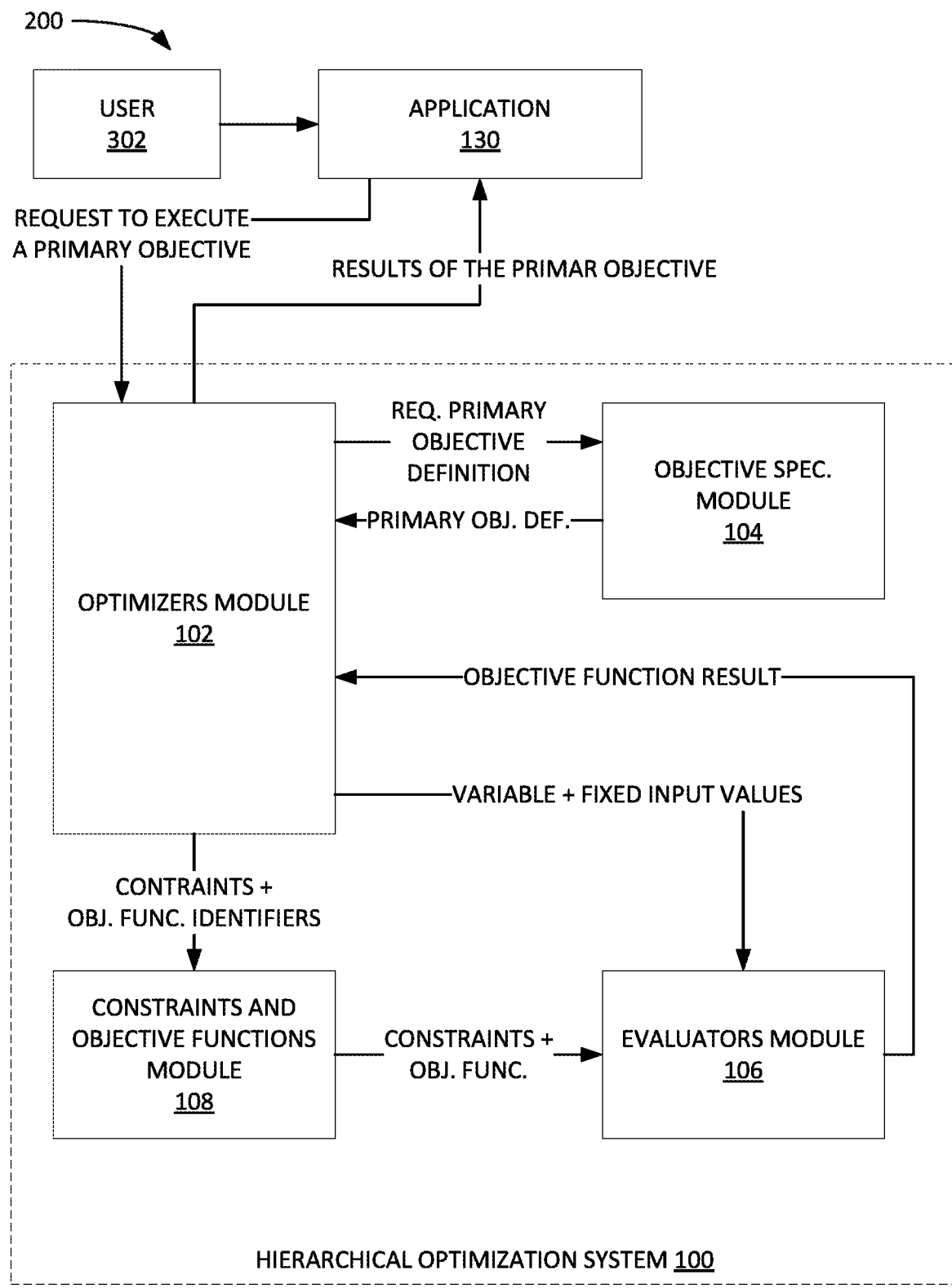
FIG. 3 depicts an example process flow for hierarchical optimization for processing objectives sequentially and/or iteratively over one or more time steps, in accordance with certain embodiments of the present disclosure.
Figure 4:
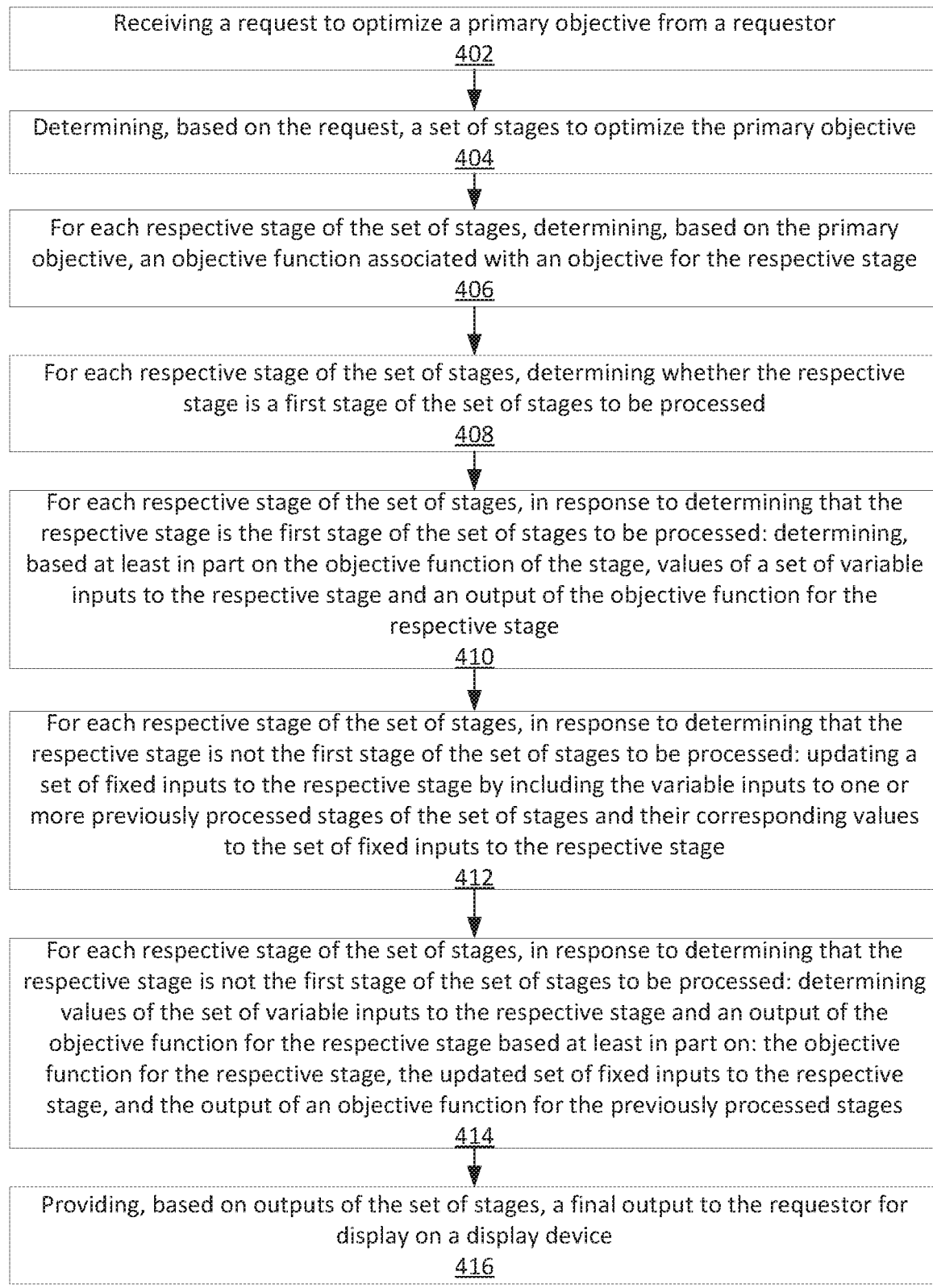
FIG. 4 depicts an example method of hierarchical optimization for processing objectives sequentially and/or iteratively over one or more time steps, in accordance with certain embodiments of the present disclosure.

Additional details of the hierarchical optimization of a primary objective are described herein with reference to FIGS. 2-4.

Example Hierarchical Optimization System

FIG. 1 depicts an example hierarchical optimization system 100 for optimizing one or more primary objectives. As shown in FIG. 1, the hierarchical optimization system 100 may be communicatively coupled to an application 130, and a data store 140. The hierarchical optimization system 100 includes optimizers module 102, objective specifications module 104, evaluators module 106, constraints and objective functions module 108.

The optimizers module 102 may include one or more optimizers 112a, 112b, ..., 112n, collectively referred to as optimizers 112, which are configured to determine the optimal values for the variable inputs of a sub-objective. Examples of the one or more optimizers 112 may include, but are not limited to, simplicial homology global optimisation (SHGO) optimizers, sequential least squares quadratic programming (SLSQP) optimizers, linear programming (LinProg) optimizers, and the like. In some implementations, each optimizer 112 may be configured to work best for a certain sub-objective. In some implementations, each optimizer may be associated with a certain sub-objective. For example, a first optimizer may be associated with minimizing tax liability, and another optimizer may be associated with reducing debt payments. In some implementations, each optimizer may be associated with one or more sub-objectives. For example, an optimizer may be associated with the sub-objective of maximizing retirement contributions and the sub-objective of maximizing tax refunds.

The association of the optimizers 112 and the sub-objectives may be stored in a data storage unit communicatively coupled to the hierarchical optimization system 100. In some implementations, the hierarchical optimization system 100 may be configured to receive an association between the optimizers and the sub-objective from a user (e.g., domain expert) via the application 130. For example, a user, when registering a sub-objective with the hierarchical optimization system 100, may specify an optimizer to be used for during the processing of the sub-objective. Additional details of registering primary objectives and/or one or more sub-objectives are described herein with reference to FIG. 2. In some implementations, optimizers 112 may be updated in response to new versions of the optimizers 112 being available. In some implementations, new optimizers may be added to the optimizers module 102 when a new sub-objective is registered with the hierarchical optimization system 100.

The objective specifications 104 may store all primary objectives and/or sub-objectives specified by the user. The objective specifications 104 may store the primary objectives and/or sub-objectives in one or more data structures (e.g., tables). The objective specifications 104 may store each primary objective in association with a unique identifier of the primary objective and may store the one or more sub-objectives of the primary objective, one or more stages associated with the primary objective, a sequence of stages associated with the sub-objective. For each sub-objective stored in the data structure, the data structure may store one or more features of the sub-objective such as a unique identifier associated with the sub-objective, fixed inputs for the sub-objective, variable inputs for the sub-objective, one or more constraints for the sub-objective, one or more bounds (e.g., upper bound, lower bound, and the like) for the values of the variable inputs, one or more objective functions 108 associated with the sub-objective, one or more optimizers 112 associated with the sub-objective, a stage associated with the sub-objective one or more evaluator engines 116 to compute the associated objective function(s) 118, indicate whether the sub-objective should be processed iteratively, and/or the like. In some implementations, the one or more data structures may be stored in a data storage unit communicatively coupled with the hierarchical optimization system 100.

The objective specifications 104 may receive a request to register a new primary objective along with its corresponding features from a user (e.g., domain expert) via application 130. The objective specification 104 may store the newly received primary objective and the corresponding features in the one or more data structures. The objective specifications 104 may be configured to receive a request for a primary objective (e.g., from optimizers module 102), and in response, the objective specifications 104 may transmit corresponding primary objective and the stored corresponding features of the primary objective to the requestor. For example, the optimizers module 102 may request a primary objective by transmitting a primary objective identifier to the objective specifications 104, and the objective specifications 104 may identify the primary objective based on the received objective identifier and transmit the primary objective and the corresponding features to the optimizers module 102.

In some implementations, the hierarchical optimization system 100 may be configured to process a primary objective without registering the primary objective first. For example, a new primary objective may be specified by a user and the user may transmit a request to the hierarchical optimization system 100 to process the primary objective without transmitting a request to register the primary objective. In response to receiving the request to process the new primary objective, the hierarchical optimization system 100 may process the new primary objective in similar manner as it processes a registered primary objective.

The evaluators 106 may include one or more evaluator engines 116a, 116b, . . . 116n, collectively referred to as evaluator engines 116. Each evaluator engine 116 may be associated with a format and/or syntax in which one or more objective functions are described and/or implemented, and the evaluator engine 116 may be configured to execute the objective function in its native format and/or syntax. For example, if an objective function is implemented in the programming language Python, then an evaluator engine 116 associated with Python may execute the objective function implemented in the programming language Python. In some implementations, each evaluator engine 116 may be associated with one or more objective functions, and the associations may be stored in a data storage unit communicatively coupled to the hierarchical optimization system 100. Therefore, the evaluators 106 allow the implementation and storage of objective functions and constraints to be decoupled for usage by the hierarchical optimization system 100, and allow the objective functions and constraints to be stored in a native format and/or syntax.

An optimizer 112 may cause an objective function associated with an sub-objective to be executed by providing a name and/or identifier of the objective function and one or more parameters for the objective function, such as fixed inputs, variable inputs, constraints for the values of the variable inputs, bounds for the values of the variable inputs, and the like, to an evaluator engine 116. The evaluator engine 116 may retrieve the objective function from the constraints and objective functions module 108 based on the name and/or identifier of the objective function, and execute the objective function based on the parameters received from the optimizer 112. The evaluator engine 116 may provide the result of execution of the objective function to the optimizer 112. In some implementations, an optimizer 112 may adjust the values of the variable inputs based on the result received from the evaluator engine 116 and cause the objective function to be executed again using the adjusted values of the variable inputs until the most optimized result of the objective function is received.

The constraints and objective functions module 108 may include one or more constraints 118a, 118b, . . . 118n, of the objectives and/or registered with the hierarchical optimization system 100. The constraints 118a, 118b, . . . 118n, may be collectively referred to as constraints 118. Each constraint 118 may be associated with at least one objective, and the associations between the constraint 118 and the objectives may be stored in a data storage unit of and/or communicatively coupled to the hierarchical optimization system 100. The constraints 118 may be stored as machine-readable instructions in a data storage unit of and/or communicatively coupled to the hierarchical optimization system 100.

The constraints and objective functions module 108 may include one or more objective functions 120a, 120b, . . . 120n, collectively referred to as objective functions 120. Each objective function 120 may be associated with an objective, and the associations between the objective functions 120 and the objectives may be stored in a data storage unit of and/or communicatively coupled to the hierarchical optimization system 100. As described above, an objective function 120 may be associated with an objective by a user (e.g., domain expert) when the user registers the objective with the hierarchical optimization system 100. The objective functions 120 may be stored as machine-readable instructions in a data storage unit of and/or communicatively coupled to the hierarchical optimization system 100. In some implementations, the objective functions 120 may be stored as executable machine-readable instructions. As described above, the objective functions 120 may be stored in the native format and/or syntax in which the objective function 120 is implemented without converting the objective function to a specific format and/or syntax of the hierarchical optimization system 100. For example, an objective function implemented using the programming language Python may be stored as a Python executable function and/or file without changing the file into a different format and/or syntax.

The data store 140 may store multiple objective functions 142, constraints 144, customer data 146 (e.g., customers of users), evaluators 148, and the like. Examples of customer data 146 or data related to customers include, but are not limited to, customers' income, debt, losses, expected retirement date, age, account balances, other general profile data, and the like. The hierarchical optimization system 100 (e.g., via optimizers module 102), based on customers' identifiers, may be configured to search and/or retrieve data related to the customers for values of the fixed inputs in response to receiving a request to execute an objective from a user (e.g., domain expert) via an application 130. For example, a user, via application 130, may provide a customer identifier to the hierarchical optimization system 100 when requesting execution of an objective, and the hierarchical optimization system 100, via the optimizer module 102, may search and/or retrieve values of the fixed inputs of the objective based on the received customer identifier.

In some implementations, the hierarchical optimization system 100 (e.g., via optimizers module 102) may be configured to determine whether one or more objective functions and/or constraints are stored in a data storage unit of and/or coupled to the hierarchical optimization system 100. In response to determining that the one or more objective functions and/or constraints are not available in the data storage unit, the hierarchical optimization system 100 may be configured to search and/or retrieve the one or more objective functions and/or constraints from the data store 140. For example, in response to receiving a request to execute the objective, the hierarchical optimization system 100, via the optimizers module 102, may be configured to determine whether the objective functions and/or constraints are available in a data storage unit of the hierarchical optimization system 100, and in response to determining that the objective function is not available in the data storage unit of the hierarchical optimization system 100, the hierarchical optimization system 100 may search and/or retrieve the objective functions and/or the constraints from the data store 140 and store them in a data storage unit of the hierarchical optimization system 100.

The application 130 may be any sort of application, such as a desktop application, web-based application, mobile device application, and the like. In some examples, application 130 may be a personal finance application or a tax preparation application. The application 130 may be configured with one or more user interfaces (UIs) to register objectives and request execution of the objectives.

Note that while FIG. 1 does not depict any specific network or networks, one or more networks, such as local area networks (LANs), wide area networks (WANs), and the like, may connect hierarchical optimization system 100 with the data repository 140 and the application 130, and likewise the data repository 140 with the application 130.

Example Process Flow for Registering Primary Objectives with the Hierarchical Optimization System FIG. 2 depicts an example process flow 200 for registering primary objectives with hierarchical optimization system 100.

Process flow 200 starts at 202 where a user interacts with an application 130 to register a primary objective with the hierarchical optimization system 100. As described above, the user may be a domain expert, such as an accountant, a financial planner, and the like. As part of registering the primary objective with the hierarchical optimization system 100, the user may define the primary objective by specifying an ordered list of stages, where each stage is associated with a sub-objective included in the primary objective.

For example, for a primary objective of minimizing tax liability of a customer and maximizing retirement contributions of the customer, the user may specify two stages, where a first stage may be associated with the sub-objective of minimizing the tax liability of the customer and a second stage may be associated with the sub-objective of the maximizing retirement contributions of the customer. In some implementations, a primary objective may include a single sub-objective. In such implementations, the number of stages associated with the primary objective may be one, the single stage associated with the single sub-objective. For each stage of the primary objective, the user may specify the associated sub-objective's fixed inputs, variable inputs, constraints on the values of the variable inputs, bounds on the values of the variable inputs, objective function 120, optimizer 112 for the sub-objective, and the like.

The user may specify an execution sequence for the stages of the primary objective. For example, for the primary objective of minimizing tax liability and maximizing retirement contributions, the user may specify that the stage associated with the sub-objective of minimizing tax liability may be processed first and the stage associated with the sub-objective of maximizing retirement contributions may be processed second after the processing first stage.

In some implementations, the user may specify whether a stage is processed iteratively. In specifying that a stage is processed iteratively, the user may specify a termination condition for the iteration, such that the hierarchical optimization system 100 may be configured to iteratively process the stage until the termination condition is satisfied. For example, if a sub-objective is calculate debt payments, then the termination condition may be a complete repayment of the debt.

In some implementations, the user may specify one or more time periods over which the hierarchical optimization system 100 may iteratively process the sub-objective. For example, for a sub-objective of calculating maximum debt payments over the next 6 months, the user may specify that the stage associated with this sub-objective be processed iteratively and over the next 6 months. The number of time periods may be specified with respect to the customer's circumstance and are not limited to any particular time period or length.

In some implementations, the user may specify that a stage is processed iteratively over a number of time periods, and the hierarchical optimization system may be configured to determine the number of variable inputs to be calculated in each iteration based on a set of stored rules. In some implementations, the stored rules may specify that the number of variables inputs to be calculated per iteration may be based on total number of variables and the number of time periods (e.g., total number of variables divided by the total number of time periods). For example, if the total number of variable inputs of a sub-objective is 1000, and the user specifies the number of time periods as 10, the set of stored rules specify that the total number of variable inputs divided by the number of time periods determines the number of variables calculated per iteration, then the hierarchical optimization system 100 determines that 100 variables are calculated in each iteration (e.g., values of a first 100 variable inputs are calculated in the first iteration, and values of a second 100 variable inputs are calculated in the second iteration, and so on).

The user may send a request to register the defined primary objective to the hierarchical optimization system 100 via the application 130, and the hierarchical optimization system 100 may be configured to receive the request to register the defined primary objective from the user. For example, the application 130 may generate and send a configuration file comprising the definition of the primary objective to the hierarchical optimization system 100 along with a request to register the primary objective with the hierarchical optimization system 100 in response to the user providing a command to the application 130 to register the primary objective definition to the hierarchical optimization system 100.

The configuration file of the primary objective along with the request to register the primary objective is transmitted to the hierarchical optimization system 100 from the application 130. The objective specifications 104 may receive the configuration file of the primary objective, and in response, the objective specifications 104 stores the definition of the primary objective in a data storage unit of and/or communicatively coupled to the hierarchical optimization system 100 based on the configuration file. In storing the definition of the primary objective in the data storage unit of and/or communicatively coupled to the hierarchical optimization system 100, the objective specifications 104 may store the fixed inputs, variable inputs, constraints on the values of the variable inputs, bounds on the values of the variable inputs, objective function(s) 120, optimizer(s) 112, and the like, in association with the corresponding sub-objective of the primary objective in the data storage unit of and/or communicatively coupled to the hierarchical optimization system 100.

In some implementations, the objective specifications module 104 may be configured to retrieve the optimizers 112, evaluators 116, constraints 118, objective functions 120, and/or other features of the primary objective specified in the configuration file from the data store 140 when the objective specifications 104 determines that they are not available and/or stored in a data storage unit of and/or communicatively coupled to the hierarchical optimization system 100.

In some implementations, the objective specifications module 104 may be configured to receive new objective functions from the user via the application 130, and the objective specifications 104 may store the new objective functions in the data storage unit of and/or communicatively coupled to the hierarchical optimization system 100. In some implementations, the user may indicate the native format and/or syntax in which the new objective function is implemented, and the objective specifications 104 may determine whether an evaluator 116 configured to execute the new objective function in its native format is available in the data storage unit of and/or communicatively coupled to hierarchical optimization system 100. In response to determining that an evaluator 116 configured to execute the new objective function is not available, the objective specifications 104, based on the indicated native format and/or syntax of the new objective function, may be configured to retrieve, from the data store 140, an evaluator 116 that is configured execute the new objective function.

In response to successfully registering the primary objective in the hierarchical optimization system 100, an acknowledgement may be provided to the user indicating that request to register the primary objective is successfully completed. For example, the objective specifications 104 may cause an alert indicating a successful registration of the primary objective to be displayed on a graphical user interface of the application 130 to provide an alert to the user that the request to register is successfully completed by the hierarchical optimization system 100. If the primary objective is not successfully registered, then the hierarchical optimization system 100 may provide an alert to the user indicating that the request to register is not successful. Notably, flow 200 is just one example, and many other examples are possible.

Example Process Flow for Executing Primary Objectives with the Hierarchical Optimization System FIG. 3 depicts an example process flow 300 for executing a primary objective with hierarchical optimization system 100.

Process flow 300 starts at 302 where a user (e.g., domain expert) interacts with the application 130 to execute a primary objective with the hierarchical optimization system 100. The user may send a request to execute the primary objective via the application 130. The application 130 may transmit the request to process the primary objective to the hierarchical optimization system 100. In transmitting the request to execute the primary objective, the application 130 may transmit a unique identifier associated with the primary objective and values of one or more fixed inputs (e.g., gross income of the customer, debt amount, retirement date, and the like) to one or more sub-objectives of the primary objective.

Based on the unique identifier from the application 130, a definition of the primary objective associated with the unique identifier is provided to an optimizer 112 associated with the sub-objective of the first stage of the primary objective. The optimizer 112 may identify constraints 118 and the objective function 120 associated with the sub-objective of the first stage based on the definition of the primary objective, and provides the identifiers of the constraints 118 and the objective function 120 to the constraints and objective functions module 108. In some implementations, providing the identifiers of the constraints 118 and the objective function 120 to the constraints and objective functions module 108 causes the constraints and objective functions module 108 to provide the constraints 118 and objective function 120 to the evaluator 116 associated with the objective function 120.

The optimizer 112 may provide values of the fixed inputs and variable inputs to the evaluator 116. In some implementations, the optimizer 112 may determine an initial set of values of the variable inputs to the objective function. The evaluator 116 determines a result of the objective function, based on the values of the fixed inputs and the variable inputs to the objective function. The evaluator 116 provides the result of the objective function to the optimizer 112.

The optimizer 112 may be configured to determine whether the result of the objective function is the most optimized result. In response to determining that the result is not the most optimized result of the objective function, the optimizer 112 may adjust the values of the variable inputs and provide the adjusted values of the variable inputs and the fixed inputs again to the evaluator 116 for another result of the objective function. The evaluator 116 may determine another result of the objective function and provides the result to the optimizer 112. The optimizer 112 may continue to adjust the values of the variable inputs and provide them to the evaluator 116 until the result of the objective function satisfies an optimization threshold.

After the most optimized result of the objective function of the first stage is determined, the hierarchical optimization system 100 may determine whether the primary objective includes any additional stages to be processed. For each additional stage to be processed, a corresponding optimizer 112 associated with the sub-objective of the stage may cause an evaluator 116 to evaluate the objective function based on values of the fixed inputs and variable inputs from the optimizer 112. Similar to the first stage, for each additional stage, the optimizer 112 may continue to adjust the values of the variable inputs until a result of the corresponding objective function of the stage satisfies an optimization threshold.

The hierarchical optimization system 100, after successfully processing all stages of the primary objective, provides the final results of each stage to the user (e.g., domain expert) via the application 130. Notably, flow 300 is just one example, and many other examples are possible.

Example Method of Hierarchical Optimization for Processing Objectives Sequentially And/Or Iteratively FIG. 4 depicts an example method 400 of hierarchical optimization of processing objectives sequentially and/or iteratively.

Method 400 begins at step 402 with receiving a request to optimize a primary objective from a requestor.

In some implementations, the request to optimize a primary objective may include an identifier associated with the primary objective. In some implementations, the requestor may be an application (e.g., application 130) communicatively coupled to a hierarchical optimization system (e.g., the hierarchical optimization system 100).

Method 400 then proceeds to step 404 with determining, based on the request, an ordered set of stages to optimize the primary objective.

As described above, an ordered set of stages to optimize the primary objective may be provided by a user (e.g., domain expert), and the ordered set of stages is a sequence in which the stages are processed when the primary objective is processed.

Method 400 then proceeds to step 406 with, for each respective stage of the set of stages, determining, based on the primary objective, an objective function associated with a sub-objective for the respective stage.

Method 400 then proceeds to step 408 with, for each respective stage of the set of stages, determining whether the respective stage is a first stage of the set of stages to be processed.

Method 400 then proceeds to step 410 with, for each respective stage of the set of stages, in response to determining that the respective stage is the first stage of the set of stages to be processed: determining, based at least in part on the objective function of the stage, values of a set of variable inputs to the respective stage and an output of the objective function for the respective stage.

Method 400 then proceeds to step 412 with, for each respective stage of the set of stages, in response to determining that the stage is not the first stage of the set of stages to be processed: updating a set of fixed inputs to the respective stage by including the variable inputs to one or more previously processed stages of the set of stages and their corresponding values to a set of fixed inputs to the respective stage.

Method 400 then proceeds to step 414 with, for each respective stage of the set of stages, in response to determining that the stage is not the first stage of the set of stages to be processed: determining values of the set of variable inputs to the respective stage and an output of the objective function for the respective stage based at least in part on: the objective function for the respective stage, the updated set of fixed inputs to the respective stage, and the output of an objective function for the previously processed stages.

Method 400 then proceeds to step 416 with, providing, based on outputs of the set of stages, a final output to the requestor for display on a display device.

In some implementations, method 400 further comprises determining, based on the request to optimize the primary objective, a sequential order of execution for the set of stages, and executing, based on the determined sequential order of execution, the set of stages. For example, the request to optimize the primary objective may specify the sequential order in which the set of stages are processed.

In some implementations, the method 400 further comprises, for each respective stage of the set of stages: determining whether an optimization objective of the stage is iterative, and in response to determining that the optimization objective of the stage is iterative: determining one or more subsets of the variable inputs to the respective stage; and until a termination condition is satisfied: iteratively determining, based at least in part on the objective function for the respective stage, values of the one or more subsets of the variable inputs to the respective stage; and determining, based on the calculated values of the one or more subsets of the variable inputs, an output of the respective stage.

In some implementations, the values of the variable inputs to the respective stage are determined based on the iteratively calculated values of the one or more subsets of the variable inputs to the stage, such as described above with respect to FIGS. 1-3. In some implementations, the output of the respective stage is determined based on a collection criteria and intermediate outputs of the iterations until the termination condition is satisfied, such as described above with respect to FIGS. 1-3. As described above, collection criteria may be a way to group and/or aggregate results of the objective function of each iteration. In some implementations, the collection criteria is indicated in the received request to optimize the primary objective.

In some implementations, each stage of the set of stages corresponds to a portion of the primary objective, and the output of the objective function of the stage is optimized to determine values for the corresponding portion of the primary objective. For example, each stage of the set of stages corresponds to a sub-objective of the multiple sub-objectives included in the primary objective, and the output of the objective function is optimized to calculate a result of that sub-objective. In some implementations, an objective function for each respective stage of the set of stages is different from objective functions for other stages of the set of stages.

In some implementations, the method 400 further comprises, for each respective stage of the set of stages: determining, based on the request to optimize the primary objective, a set of constraints for the set of variable inputs to the respective stage, such as described above with respect to FIG. 3. In some implementations, the set of constraints for the set of variable inputs to each respective stage of the set of stages is different from sets of constraints for sets of variable inputs to other stages of the set of stages, such as described above with respect to FIG. 3. In some implementations, the values of the set of variable inputs to the respective stage are determined based on the set of constraints and the objective function for the set of variable inputs to the respective stage, such as described above with respect to FIG. 3.

Example Processing System

Figure 5:
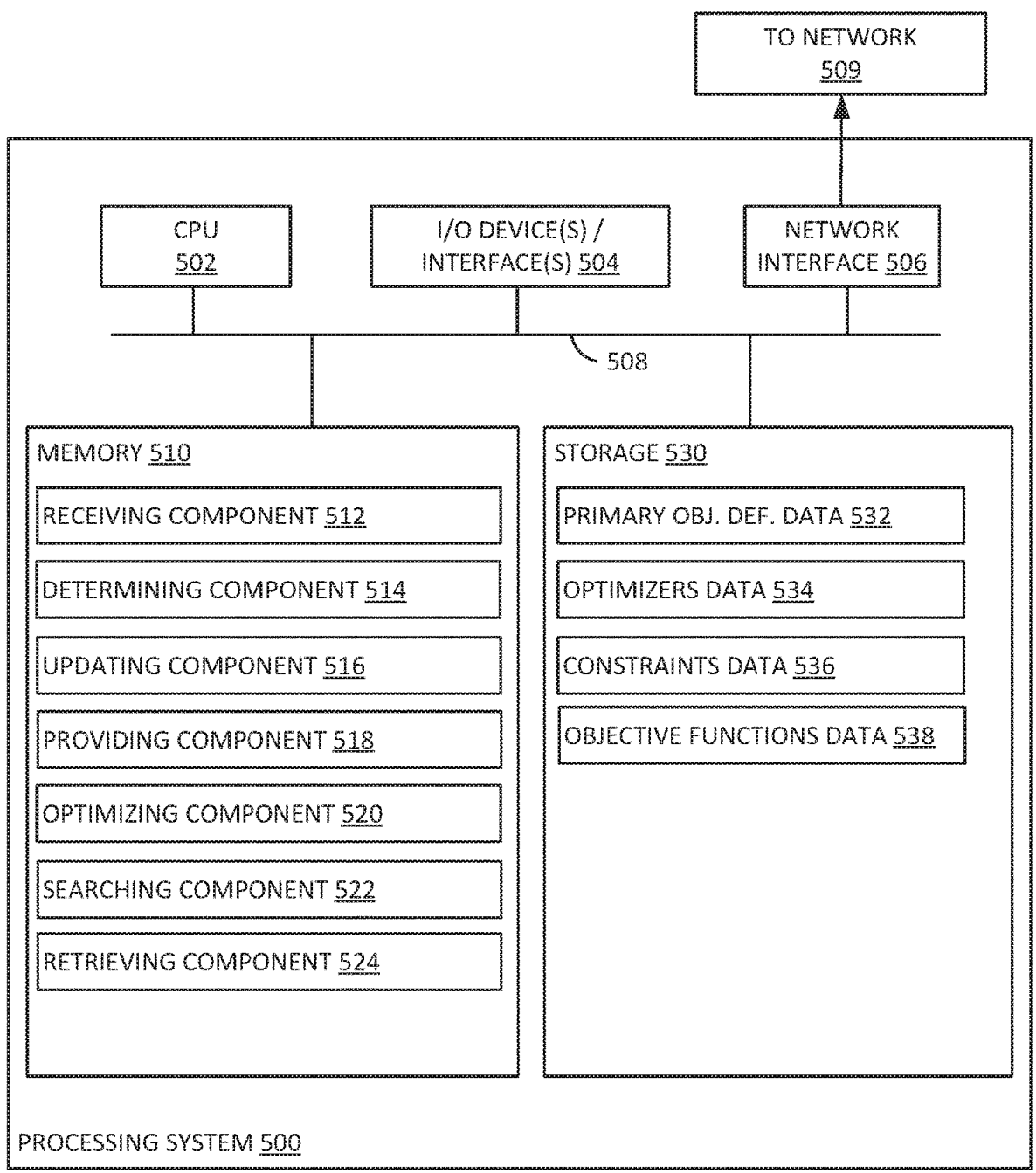
FIG. 5 depicts an example processing system configured to perform methods for hierarchical optimization of objectives sequentially and/or iteratively over one or more time steps, in accordance with certain embodiments of the present disclosure.

FIG. 5 depicts an exemplary processing system 500 configured to perform methods for hierarchical optimization of processing objectives sequentially and/or iteratively.

Processing system 500 includes a CPU 502 connected to a data bus 508. CPU 502 is configured to process computer-executable instructions, e.g., stored in memory 510 or storage 530, and to cause processing system 500 to perform methods as described herein, for example with respect to FIGS. 2-4. CPU 502 is included to be representative of a single CPU, multiple CPUs, a single CPU having multiple processing cores, and other forms of processing architecture capable of executing computer-executable instructions.

Processing system 500 further includes input/output devices and interface 504, which allows processing system 500 to interface with input/output devices, such as, for example, keyboards, displays, mouse devices, pen input, touch sensitive input devices, cameras, microphones, and other devices that allow for interaction with processing system 500. Note that while not depicted with independent external I/O devices, processing system 500 may connect with external I/O devices through physical and wireless connections (e.g., an external display device).

Processing system 500 further includes network interface 506, which provides processing system 500 with access to external computing devices, such as via network 509.

Processing system 500 further includes memory 510, which in this example includes various components configured to perform the functions described herein. In this implementation, memory 510 includes receiving component 512, determining component 514, updating component 516, providing component 518, optimizing component 520, searching component 522, and retrieving component 524. These various components may, for example, comprise computer-executable instructions configured to perform the various functions described herein.

Processing system 500 further includes primary objective definition data 532, which may be data related to the primary objectives described above with respect to FIG. 1. Memory 510 also includes optimizers data 534, which may be data related to the optimizers 112 described above with respect to FIG. 1. Memory 510 also includes constraints data 536, which may be data related to the constraints 118 described above with respect to FIG. 1. Memory 510 also includes objective functions data 538, which may be data related to objective functions 120 described above with respect to FIG. 1. While not depicted in FIG. 5, other aspects may be included in memory 510.

Note that while shown as a single memory 510 in FIG. 5 for simplicity, the various aspects stored in memory 510 may be stored in different physical memories, but all accessible CPU 502 via internal data connections, such as bus 512. For example, some components of memory 510 may be locally resident on processing system 500, while others may be performed on remote processing systems or in cloud-based processing systems in other embodiments. This is just one example.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
receiving a request to optimize a primary objective from a requestor;
determining, based on the request, a set of stages to optimize the primary objective;
for each respective stage of the set of stages:
determining, based on the primary objective, an objective function associated with a sub-objective for the respective stage;
selecting, based on a native format of the objective function, an evaluator engine from a plurality of evaluator engines for evaluating the objective function associated with the sub-objective for the respective stage;
determining whether the respective stage is a first stage of the set of stages to be processed;
in response to determining that the respective stage is the first stage of the set of stages to be processed:
determining, based at least in part on the objective function of the respective stage, values of a set of variable inputs to the respective stage and an output of the objective function for the respective stage, wherein the output of the objective function for the respective stage is based on evaluating, by the evaluator engine, the objective function for the respective stage based on the values of the set of variable inputs to the respective stage; and
in response to determining that the respective stage is not the first stage of the set of stages to be processed:
updating a set of fixed inputs to the respective stage by including the set of variable inputs to one or more previously processed stages of the set of stages and their corresponding values to the set of fixed inputs to the respective stage; and determining values of the set of variable inputs to the respective stage and an output of the objective function for the respective stage based at least in part on: the objective function for the respective stage, the updated set of fixed inputs to the respective stage, and the output of an objective function for the previously processed stages, wherein the output of the objective function for the respective stage is based on evaluating, by the evaluator engine, the objective function for the respective stage based on the values of the set of variable inputs to the respective stage; and providing, based on outputs of the set of stages, a final output to the requestor for display on a display device.

2. The method of claim 1, further comprising:
determining, based on the request to optimize the primary objective, a sequential order of execution for the set of stages; and
executing, based on the determined sequential order of execution, the set of stages.

3. The method of claim 1, further comprising:
for each respective stage of the set of stages:
determining whether an optimization objective of the respective stage is iterative; and
in response to determining that the optimization objective of the respective stage is iterative:
determining one or more subsets of the set of variable inputs to the respective stage; and
until a termination condition is satisfied:
iteratively determining, based at least in part on the objective function for the respective stage, values of the one or more subsets of the set of variable inputs to the respective stage; and
determining, based on the determined values of the one or more subsets of the set of variable inputs, an output of the respective stage.

4. The method of claim 3, wherein the values of the set of variable inputs to the respective stage are determined based on the iteratively determined values of the one or more subsets of the set of variable inputs to the respective stage.

5. The method of claim 3, wherein the output of the respective stage is determined based on a collection criteria and intermediate outputs of iterations until the termination condition is satisfied.

6. The method of claim 5, wherein the collection criteria is indicated in the received request to optimize the primary objective.

7. The method of claim 1, wherein:
each stage of the set of stages corresponds to a portion of the primary objective, and
the output of the objective function of the stage is optimized to determine values for the corresponding portion of the primary objective.

8. The method of claim 1, wherein an objective function for each respective stage of the set of stages is different from objective functions for other stages of the set of stages.

9. The method of claim 1, further comprising: for each respective stage of the set of stages: determining, based on the request to optimize the primary objective, a set of constraints for the set of variable inputs to the respective stage.

10. The method of claim 9, wherein the set of constraints for the set of variable inputs to each respective stage of the set of stages is different from sets of constraints for sets of variable inputs to other stages of the set of stages.

11. The method of claim 9, wherein the values of the set of variable inputs to the respective stage are determined based on the set of constraints and the objective function for the set of variable inputs to the respective stage.

12. A processing system, comprising:
a memory comprising computer-executable instructions;
a processor configured to execute the computer-executable instructions and cause the processing system to:
receive a request to optimize a primary objective from a requestor;
determine, based on the request, a set of stages to optimize the primary objective;
for each respective stage of the set of stages:
determine, based on the primary objective, an objective function associated with a sub-objective for the respective stage;
select, based on a native format of the objective function, an evaluator engine from a plurality of evaluator engines for evaluating the objective function associated with the sub-objective for the respective stage;
determine whether the respective stage is a first stage of the set of stages to be processed;
when the respective stage is the first stage of the set of stages to be processed:
determine, based at least in part on the objective function of the respective stage, values of a set of variable inputs to the respective stage and an output of the objective function for the respective stage, wherein the output of the objective function for the respective stage is based on evaluating, by the evaluator engine, the objective function for the respective stage based on the values of the set of variable inputs to the respective stage; and
when the respective stage is not the first stage of the set of stages to be processed:
update a set of fixed inputs to the respective stage by including the set of variable inputs to one or more previously processed stages of the set of stages and their corresponding values to a set of fixed inputs to the respective stage; and
determine values of the set of variable inputs to the respective stage and an output of the objective function for the respective stage based at least in part on: the objective function for the respective stage, the updated set of fixed inputs to the respective stage, and the output of an objective function for the previously processed stages, wherein the output of the objective function for the respective stage is based on evaluating, by the evaluator engine, the objective function for the respective stage based on the values of the set of variable inputs to the respective stage; and
provide, based on outputs of the set of stages, a final output to the requestor for display on a display device.

13. The processing system of claim 12, wherein the processor is further configured to cause the processing system to:
determine, based on the request to optimize the primary objective, a sequential order of execution for the set of stages; and
execute, based on the determined sequential order of execution, the set of stages.

14. The processing system of claim 12, wherein the processor is further configured to cause the processing system to:
for each respective stage of the set of stages:
determine whether an optimization objective of the respective stage is iterative; and
when the optimization objective of the respective stage is iterative:
determine one or more subsets of the set of variable inputs to the respective stage; and
until a termination condition is satisfied;
iteratively determining, based at least in part on the objective function for the respective stage, values of the one or more subsets of the set of variable inputs to the respective stage; and
determine, based on the determined values of the one or more subsets of the set of variable inputs, an output of the respective stage.

15. The processing system of claim 14, wherein the values of the set of variable inputs to the respective stage are determined based on the iteratively determined values of the one or more subsets of the set of variable inputs to the respective stage.

16. The processing system of claim 14, wherein the output of the respective stage is determined based on a collection criteria and intermediate outputs of iterations until the termination condition is satisfied.

17. The processing system of claim 12, wherein:
each stage of the set of stages corresponds to a portion of the primary objective, and
the output of the objective function of the stage is optimized to determine values for the corresponding portion of the primary objective.

18. A non-transitory computer-readable medium comprising computer-executable instructions, which, when executed by a processing system, causes the processing system to perform a method, the method comprising:
receiving a request to optimize a primary objective from a requestor;
determining, based on the request, a set of stages to optimize the primary objective;
for each respective stage of the set of stages:
determining, based on the primary objective, an objective function associated with a sub-objective for the respective stage;
selecting, based on a native format of the objective function, an evaluator engine from a plurality of evaluator engines for evaluating the objective function associated with the sub-objective for the respective stage;
determining whether the respective stage is a first stage of the set of stages to be processed;
in response to determining that the respective stage is the first stage of the set of stages to be processed:
determining, based at least in part on the objective function of the respective stage, values of a set of variable inputs to the respective stage and an output of the objective function for the respective stage, wherein the output of the objective function for the respective stage is based on evaluating, by the evaluator engine, the objective function for the respective stage based on the values of the set of variable inputs to the respective stage; and
in response to determining that the respective stage is not the first stage of the set of stages to be processed:
updating a set of fixed inputs to the respective stage by including the set of variable inputs to one or more previously processed stages of the set of stages and their corresponding values to a set of fixed inputs to the respective stage; and
determining values of the set of variable inputs to the respective stage and an output of the objective function for the respective stage based at least in part on: the objective function for the respective stage, the updated set of fixed inputs to the respective stage, and the output of an objective function for the previously processed stages, wherein the output of the objective function for the respective stage is based on evaluating, by the evaluator engine, the objective function for the respective stage based on the values of the set of variable inputs to the respective stage; and
providing, based on outputs of the set of stages, a final output to the requestor for display on a display device.

19. The non-transitory computer-readable medium of claim 18, wherein the method further comprises:
for each respective stage of the set of stages:
determining whether an optimization objective of the respective stage is iterative; and
in response to determining that the optimization objective of the respective stage is iterative:
determining one or more subsets of the set of variable inputs to the respective stage, wherein a size of each of the one or more subsets satisfies a threshold subset size; and
until a termination condition is satisfied;
iteratively determining, based at least in part on the objective function for the respective stage, values of the one or more subsets of the set of variable inputs to the respective stage; and
determining, based on the determined values of the one or more subsets of the set of variable inputs, an output of the respective stage.

20. The non-transitory computer-readable medium of claim 19, wherein the values of the set of variable inputs to the respective stage are determined based on the iteratively determined values of the one or more subsets of the set of variable inputs to the respective stage.

* * * * *